(12) United States Patent
Jähnisch et al.

(10) Patent No.: US 11,048,962 B2
(45) Date of Patent: Jun. 29, 2021

(54) METHOD FOR DETERMINING THE ARTICULATION ANGLE OF A COMBINATION

(71) Applicant: Volkswagen Aktiengesellschaft, Wolfsburg (DE)

(72) Inventors: Marco Jähnisch, Berlin (DE); Oliver Berger, Kleinmachnow (DE); Christoph Erfurth, Berlin (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 112 days.

(21) Appl. No.: 16/610,412

(22) PCT Filed: May 3, 2018

(86) PCT No.: PCT/EP2018/061321
§ 371 (c)(1),
(2) Date: Nov. 1, 2019

(87) PCT Pub. No.: WO2018/202762
PCT Pub. Date: Nov. 8, 2018

(65) Prior Publication Data
US 2021/0166051 A1 Jun. 3, 2021

(30) Foreign Application Priority Data
May 3, 2017 (DE) ...................... 10 2017 207 438.8

(51) Int. Cl.
*G06K 9/46* (2006.01)
*H04N 9/793* (2006.01)
(Continued)

(52) U.S. Cl.
CPC ........... *G06K 9/4604* (2013.01); *B60D 1/145* (2013.01); *B60D 1/245* (2013.01);
(Continued)

(58) Field of Classification Search
CPC ............. G06K 9/4604; G06K 9/00791; G06K 9/4652; B60D 1/145; B60D 1/245; H04N 5/2351; H04N 5/2353; H04N 9/793
(Continued)

(56) References Cited

U.S. PATENT DOCUMENTS 8,199,975 B2 6/2012 Pomerleau ................... 382/104
8,294,794 B2 10/2012 Zhang et al. ................ 348/251
(Continued)

FOREIGN PATENT DOCUMENTS

DE 102017207438 A1 11/1918 ............... B60D 1/30
DE 102006055905 A1 5/2008 ............... B60R 1/00
(Continued)

OTHER PUBLICATIONS

German Office Action, Application No. 102017207438.8, 6 pages, dated Mar. 1, 2018.
(Continued)

*Primary Examiner* — Allen C Wong
(74) *Attorney, Agent, or Firm* — Slayden Grubert Beard PLLC

(57) ABSTRACT

The invention relates to a method and to a device for determining the articulation angle of a combination, consisting of a towing vehicle and a trailer attached using a tongue, by identifying the hitch tongue using a digital back-up camera with variable exposure times, the following steps being carried out: a) recording a first color image of the rear environment of the towing vehicle, the color image being based on the HSY color space, b) analyzing the hue values, saturation values and brightness values of adjacent surfaces of a vehicle-environment region that is to be evaluated, c) determining the tongue from the first color image using an edge detection method in order to determine the articulation angle if the hue values, saturation values and
(Continued)

brightness values of adjacent surfaces in the region that is to be evaluated are substantially equal, "substantially equal" meaning that the values of hue, saturation and brightness of adjacent surfaces differ by at most a first threshold in percent, d) recording a second color image in the HSY color space if in the first color image the hue values and saturation values of adjacent surfaces in the region that is to be evaluated are substantially equal while the brightness values of the adjacent surfaces deviate greatly from each other, "deviate greatly from each other" meaning that the brightness values of adjacent surfaces differ from each other by more than a second threshold in percent, the exposure time of the second color image being selected in such a way that the brightness values of the adjacent surfaces within the vehicle-environment region that is to be evaluated are substantially equal, e) determining the tongue from the second color image by means of an edge detection method in order to determine the articulation angle.

15 Claims, 3 Drawing Sheets

(51) Int. Cl.
*B60D 1/24* (2006.01)
*H04N 5/235* (2006.01)
*B60D 1/145* (2006.01)
*G06K 9/00* (2006.01)

(52) U.S. Cl.
CPC ....... *G06K 9/00791* (2013.01); *G06K 9/4652* (2013.01); *H04N 5/2351* (2013.01); *H04N 5/2353* (2013.01); *H04N 9/793* (2013.01)

(58) Field of Classification Search
USPC .......................................................... 348/148
See application file for complete search history.

(56) References Cited

U.S. PATENT DOCUMENTS

| | | | |
|---|---|---|---|
| 2014/0200759 A1 | 7/2014 | Lu et al. .......................... | 701/28 |
| 2015/0321697 A1* | 11/2015 | Lu ........................... | B60D 1/305 |
| | | | 701/28 |
| 2016/0034784 A1* | 2/2016 | Ohmura ................ | G06K 9/6254 |
| | | | 382/103 |
| 2016/0148073 A1 | 5/2016 | Uffenkamp et al. .......... | 348/148 |
| 2017/0158007 A1* | 6/2017 | Lavoie ................... | B60W 10/30 |

FOREIGN PATENT DOCUMENTS

| | | | | |
|---|---|---|---|---|
| DE | 102007059735 A1 | 7/2008 | ............. | H04N 5/247 |
| DE | 10160719 B4 | 6/2011 | ............... | G06K 9/46 |
| DE | 102011106050 A1 | 1/2012 | ............. | G06T 15/50 |
| DE | 102011101990 B3 | 10/2012 | ................ | B60D 1/30 |
| DE | 102012024650 A1 | 6/2014 | ............. | B60R 11/04 |
| DE | 102013212495 A1 | 12/2014 | ............. | G01B 11/24 |
| WO | 2016/119920 A1 | 8/1916 | ............... | B60D 1/24 |
| WO | 2018/202762 A1 | 11/1918 | ............... | B60D 1/24 |
| WO | 2012/103193 A1 | 8/2012 | ............. | G01C 22/00 |

OTHER PUBLICATIONS

International Search Report and Written Opinion, Application No. PCT/EP2018/061321, 7 pages, dated Sep. 12, 2018.

* cited by examiner

METHOD FOR DETERMINING THE ARTICULATION ANGLE OF A COMBINATION

CROSS-REFERENCE TO RELATED APPLICATIONS

This application claims priority to German Patent Application No. DE 10 2017 207 438.8, filed on May 3, 2017 with the German Patent and Trademark Office. The contents of the aforesaid Patent Application are incorporated herein for all purposes.

TECHNICAL FIELD

The invention relates to a method for determining the articulation angle of a combination in a trailer maneuvering assist as well as a corresponding device.

In a trailer maneuvering assist for maneuvering a combination consisting of a towing vehicle and a trailer coupled thereto, the trailer of the combination and in particular its drawbar is monitored by means of a backup camera in order to be able to determine the articulation angle of the trailer relative to the towing vehicle using the drawbar, the knowledge of which is necessary for successfully maneuvering the combination.

BACKGROUND

The document DE 10 2011 101 990 B3 relates to a method and a device for determining a relative drawbar angle in an articulated combination, wherein the articulated combination comprises a tractor part and a trailer, wherein
  the tractor part and the trailer are mechanically coupled by a rotatably mounted drawbar,
  the device comprises at least one apparatus for recording images and at least one evaluation apparatus,
  the apparatus for recording images records a two-dimensional image, wherein at least part of the drawbar is shown in the image,
  by means of the evaluation apparatus, a first intensity and/or color progression along at least a first trajectory can be determined at a first point in time in a first image,
  the first trajectory shows a circular arc around a pivot point of the drawbar, wherein at at least one additional point in time in another image, another intensity and/or color progression along the first trajectory can be determined,
  a degree of similarity between the first intensity and/or color progression along the at least first trajectory in the first image, and a number of shifted additional intensity and/or color progressions along the at least first trajectory can be determined in the additional image, and
  the shifted additional intensity and color progressions along the at least first trajectory are shifted in the additional image, and the relative drawbar angle is determined depending on the degrees of similarity.

With trailer maneuvering assists that carry out an evaluation of the images from a backup camera to ascertain the articulation angle between the trailer and towing vehicle, a problem arises that the employed edge detection methods for determining the articulation angle do not work robustly and reliably with regard to cast shadow in the image.

The document DE 101 60 719 B4 relates to a method and a corresponding device for identifying and recognizing moving objects, in particular motor vehicles, wherein the device comprises at least one camera and one image processing unit, wherein a fixed image area can be recorded periodically by means of the camera, in which image area at least one region of interest is defined that is several times smaller than the image area, in which image processing unit modified images of the real recorded images can be generated by arithmetic links and/or filter functions, from which modified images hypothetical vehicle areas can be determined, from which vehicles can be detected, the detected vehicles are classifiable using vehicle prototypes, and at least one additional object attribute is ascertainable, wherein the data on a classified object and the object attribute are transmissible to a central and/or adjacent camera where the vehicle is recognized.

The document DE 10 2013 212 495 A1 relates to a method for providing an image of a surface including a contoured surface, such as the underbody of a motor vehicle, by means of at least one imaging device, wherein the method executes the following steps:
  a) recording images of one or more areas of the surface with different exposure and/or illumination;
  b) generating an optimized image for each of the areas from the plurality of recorded images; and
  c) combining the optimized images generated for the individual areas of the surface into an optimized overall image of the surface.

SUMMARY

In advanced camera systems, the method of exposure series is used to obtain sufficiently well-exposed images with little noise even under difficult light conditions, which is known by the catchword of HDR photography. This approach is also used with automotive camera manufacturers in order to achieve an improvement in the night performance of the camera system. Modern sensors are capable in this regard of recording a plurality of images at different exposure times in quick sequence, i.e., more or less simultaneously, and combining the images in the sensor. The previous solutions relate to the improvement of the image data under difficult light conditions, especially at night.

An object therefore exists to improve the identification of the drawbar and hence the determination of the articulation angle in trailer maneuvering assists, even in poor visual conditions.

This object is solved by a method and a corresponding device according to the independent claims. Embodiments of the invention are the subject of the dependent claims and the following description.

BRIEF DESCRIPTION OF THE DRAWINGS

In the FIGS.

DETAILED DESCRIPTION

Figure 1:
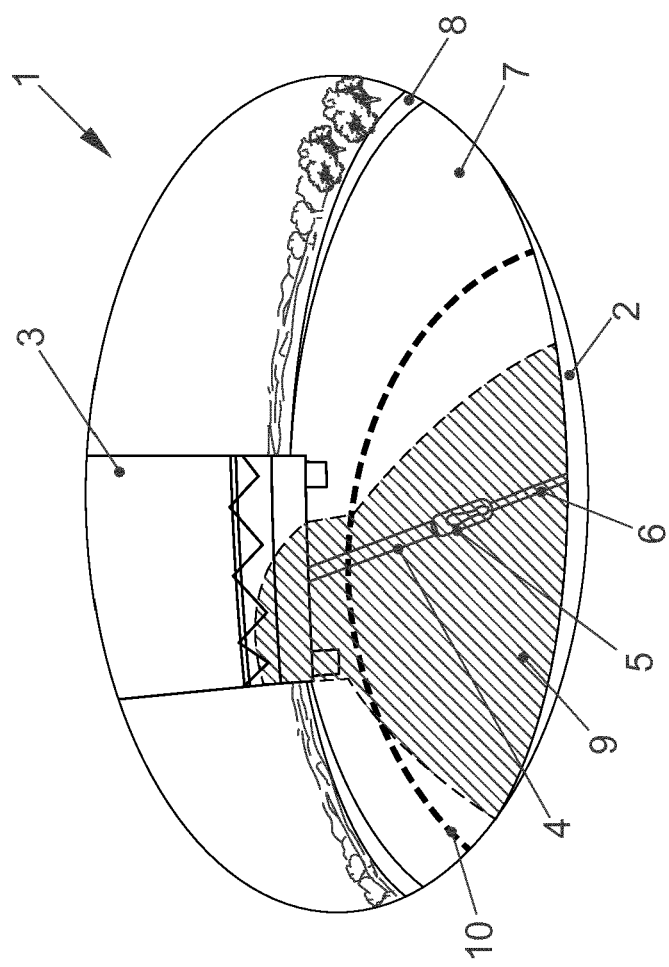
FIG. 1 shows an image from the backup camera of a vehicle with cast shadow.

In a first aspect, a method is provided for determining the articulation angle of a combination consisting of a towing vehicle and a trailer attached by means of a drawbar by recognizing the trailer drawbar with a digital backup camera with variable exposure times, wherein the following steps are executed:

a) recording a first color image of the rear environment of the towing vehicle, wherein the color image is based on the HSV color space;

b) analyzing the color values H, saturation values S and brightness values V of adjacent surfaces of an area of the vehicle environment to be evaluated;

c) determining the drawbar from the first color image by means of an edge detection method for determining the articulation angle if the color values H, saturation values S and brightness values V of adjacent surfaces are substantially the same in the area to be evaluated, wherein "substantially the same" is defined in that the respective values of color H, saturation S and brightness V of adjacent surfaces differ by a maximum of a first threshold in percent;

d) recording a second image in the HSV color space if the color values H and the saturation values S of adjacent surfaces in the area to be evaluated in the first color image are substantially the same, whereas the brightness values V of the adjacent surfaces deviate strongly from each other, wherein "strongly deviating from each other" is defined in that the brightness values V of adjacent surfaces differ from each other by more than a second threshold in percent, wherein the exposure time of the second color image is selected such that the brightness values V of the adjacent surfaces within the area of the vehicle environment to be evaluated are substantially the same;

e) determining the drawbar from the second color image by means of an edge detection method to determine the articulation angle.

In the described method, two images may be recorded sequentially over time with different exposures, and provided to the following processing chain. This makes it possible to better separate cast shadow elements in the image from objects, or respectively edges to be detected and thereby improve the performance of edge detection.

If there is no cast shadow, edge detection can occur in the first image. The absence of cast shadow can be determined by comparing the values for color H, saturation S and brightness V of adjacent areas of the surface to be evaluated under the condition that the deviation is less than a given first percent threshold.

If there is a cast shadow in the image which is determined by means of the comparison that the brightness values V of adjacent areas of the area to be evaluated differ by more than a given second percent threshold, the exposure time for the following image is changed such that the brightness values V of the adjacent surfaces are now substantially the same, wherein "substantially the same" is again defined in that the differences in the brightness values V of the adjacent surfaces may at most be equal to the first percent threshold.

In some embodiments, a value of 1% is used for the first threshold, and a value of 10% is used for the second threshold. Other threshold values can be selected corresponding to the needs of reliable edge detection for determining the articulation angle.

In some embodiments, the area to be evaluated comprises the drivable area in the surroundings or area of the drawbar. It is thereby achieved that only the surrounding area of the drawbar is employed for consideration since cast shadow hinders the detection of the drawbar only in this area.

In some embodiments, an HDR-capable backup camera is used that enables quasi-simultaneous recording of several images at different exposure times.

In a further aspect, a device is provided for determining the articulation angle of a combination consisting of a towing vehicle and a trailer attached by a drawbar, wherein the device is configured and designed to perform the method explained in the preceding description, and comprises:

a backup camera with variable exposure times for generating color images for observing the rear environment of the towing vehicle;

an apparatus for transforming the recorded color images into the HSV color space;

an apparatus for comparing the color values H, brightness values V and saturation values S of adjacent surfaces in an area of the HSV-transformed color images to be evaluated;

an apparatus for calculating an exposure time as a function of the comparisons of the color values H, saturation values S and brightness values V of adjacent surfaces of the area to be evaluated; and an apparatus for determining the articulation angle by an edge detection method from the color images.

In some embodiments, an HDR-capable backup camera is used. In this case, camera systems that simultaneously record all data can be used, or recording occurs sequentially at a frequency of 60 Hz.

The subject matter described above yields improved separability of cast shadow elements and objects, or respectively edges in the image data. With the assistance of the two differently exposed color images, it is possible for the first time to provide more image information to the edge detection in order to thereby achieve a sharper separation between cast shadow and the object to be detected. This significantly improves the robustness of edge detection in trailer maneuvering assists.

A shadow in the image, for example on asphalt, can therefore be detected by taking the HSV color space into consideration. The presence and absence of shadow is manifested in particular in the V channel of the image, i.e., the brightness level, whereas the color value H and the saturation S remain the same. A recorded image at point in time t can now be analyzed as to whether adjacent surfaces in the area to be evaluated have approximately the same H and S value, whereas the value for V reveals a strong deviation.

If this is the case, the exposure control of the camera is programmed for the next image so that the exposures of the individually recorded images are matched so that the adjacent surfaces receive the same brightness value. This theoretically subtracts the shadow.

The device according to the present aspect may in some embodiments be used in a trailer maneuvering assist. In the maneuvering process with the trailer maneuvering assist under environmental conditions with strong sunlight and resulting strong cast shadow, the edge detector can better distinguish between trailer drawbars and cast shadow that is strongly attenuated by the method or even invisible. By eliminating the cast shadow, the movement of the cast shadow is not tracked by edge detection while maneuvering; instead as desired, the movement of the drawbar of the trailer is tracked. This yields improved system performance of the trailer maneuvering assist.

A further embodiment is explained in greater detail below with reference to the drawings.

FIG. 1 shows a typical image of a backup camera of a motor vehicle which is used in a trailer maneuvering assist.

The backup camera records an image of the rear environment 1 of a vehicle, wherein only a part of the rear part 2 of the vehicle is discernible at the bottom edge of the image. Since the backup camera is provided with a wide angle lens, the rear environment 1 in the image is shown correspondingly distorted. In the image from the backup camera, a trailer 3 is discernible that is connected by a drawbar 4 having a coupling 5 to the trailer coupling 6 of the vehicle. The trailer 3 is located on a drivable surface 7 which is bordered by vegetation 8. The drivable surface 7 that for example has an asphalt layer, has a uniform color. However, a so-called cast shadow 9 that for example can be caused by the vehicle and a low-lying sun, falls on the drawbar 4, parts of the drivable surface 7 between the trailer 3 and the vehicle, and on the rear side of the trailer 3 in the example in FIG. 1, wherein the cast shadow is shown with dashed lines in FIG. 1. The cast shadow 9 on the drawbar 4 causes the drawbar 4 to be poorly discernible in the image in FIG. 1, and edge detection methods for determining the articulation angle of the trailer can therefore fail and track the movement of the edge of the cast shadow 9 instead of the movement of the drawbar.

If the cast shadow 9 on the drivable surface 7 is considered, the cast shadow 9 causes a darkening of the drivable surface 7, wherein the color of the drivable surface 7, in the example that of a bright asphalt, does not change. In the HSV color space, this means that the presence, or respectively absence of shadow is manifested in particular in the V channel of the image that represents the brightness level, wherein the color value H and the saturation S remain substantially the same. "Substantially the same" is defined by a first threshold in percent, for example 1%, wherein the differences between the considered values must be less than or equal to the first threshold.

A recorded color image at point in time t can now be analyzed as to whether adjacent surfaces in the area 10 to be evaluated, that is also designated the region of interest (ROI) have approximately the same H and S value, whereas the V value manifests a strong deviation. The area 10 to be evaluated is schematically portrayed in FIG. 1 as the drivable area which comprises the environment of the drawbar 4 with the trailer coupling 6. The term "strong deviation" is defined by a second threshold in percent that for example can be 10%, and means that two values deviate strongly from each other when they deviate by more than the second threshold. The value of 10% for the second threshold is not to be considered absolute, but rather can be selected corresponding to needs. The larger the second selected threshold, the greater the jump in brightness between the cast shadow and the drivable surface.

This is the case in the area 10 to be evaluated since the cast shadow 9 covering a part of the drivable surface 7 has a significantly different V value than the rest of the drivable surface 7 within the area 10 to be evaluated. For the next image from the backup camera at point in time t+1, the exposure control is programmed so that the exposure is matched such that the adjacent surfaces receive the same brightness value V. In the present case within the area 10 that can be evaluated, these are the drivable surface 7 lying outside of the cast shadow 9 and the cast shadow 9.

Figure 2:
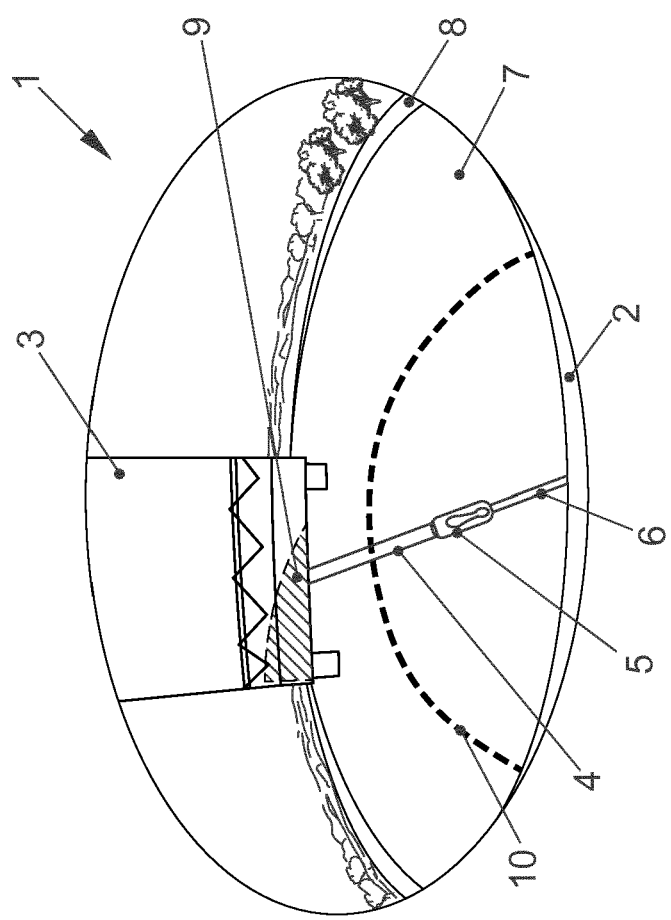
FIG. 2 shows the same image from the backup camera with modified exposure time without cast shadow.

FIG. 2 shows the following image in which the exposure is selected so that the brightness value V has the same value for the drivable surface 7 and for the cast shadow 9. The cast shadow 9 on the drivable surface 7 thereby disappears, and only appears in changed form in the rear area of the trailer 3. In this manner, the drawbar 4 is clearly discernible in comparison to the drivable surface 7 so that the articulation angle of the trailer drawbar 4 relative to the towing vehicle can be determined.

In the maneuvering process with the trailer maneuvering assist under environmental conditions with strong sunlight and resulting strong cast shadow 9, the edge detector can better distinguish between trailer drawbars 4 and cast shadow 9 that is strongly attenuated or even invisible. Consequently, it is not the movement of the cast shadow 9 that is tracked while maneuvering, but rather that of the drawbar 4 of the trailer as desired. This yields improved system performance of the trailer maneuvering assist.

Due to the two differently exposed images, information is therefore provided in the image data that is necessary for optimum and robust edge detection even in the event of cast shadow.

Figure 3:
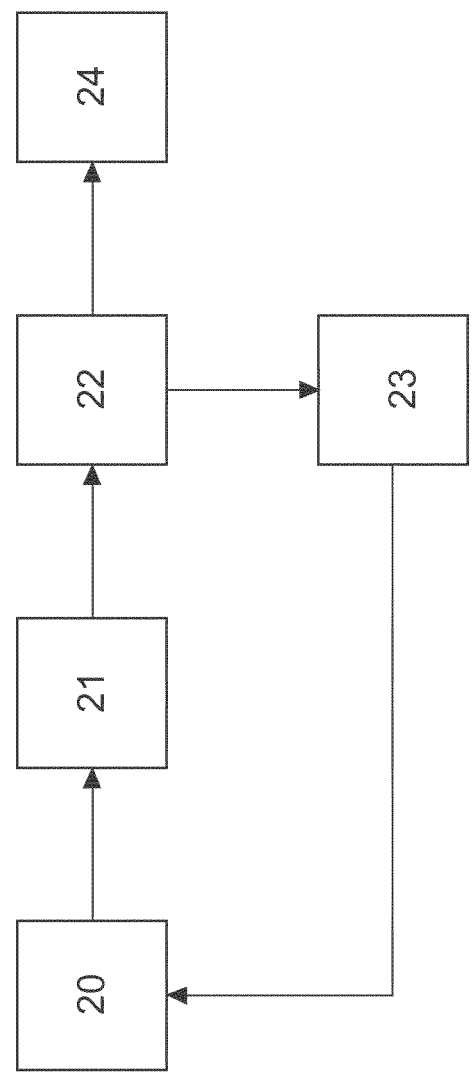
FIG. 3 shows the device for determining the articulation angle in a schematic representation.

FIG. 3 shows the device for determining the articulation angle of a combination consisting of a towing vehicle and a trailer attached by a drawbar by means of a backup camera 20 whose images are transformed into the HSV color space in a transformation apparatus 21. In a comparing apparatus 22, the color values H, saturation values S and brightness values V of adjacent surfaces are compared within a predetermined environmental area of the camera 20 and, as a function of the comparison, a suitable exposure time is determined in an exposure time apparatus 23 which is supplied to the camera 20. Suitable color images are supplied to an apparatus 24 for determining the articulation angle by means of detecting the edge of the drawbar.

REFERENCE NUMBER LIST

1 Environment
2 Rear part of the towing vehicle
3 Trailer
4 Drawbar
5 Coupling
6 Trailer coupling of the towing vehicle
7 Drivable surface
8 Vegetation at the edge of the drivable surface
9 Cast shadow
10 Area that can be evaluated—region of interest
20 Backup camera
21 HSV transformation apparatus
22 Comparing apparatus
23 Apparatus for determining the exposure time
24 Apparatus for determining the articulation angle The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the words "comprising", "including", or "having" do not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining the articulation angle of a combination consisting of a towing vehicle and a trailer attached using a drawbar by recognizing the trailer drawbar with a digital backup camera with variable exposure times, wherein the method has the following steps:

a) recording a first color image of the rear environment of the towing vehicle, wherein the color image is based on the HSV color space;

b) analyzing the color values H, saturation values S and brightness values V of adjacent surfaces of an area of the vehicle environment to be evaluated;

c) determining the drawbar from the first color image using an edge detection method for determining the articulation angle if the color values H, saturation values S and brightness values of adjacent surfaces are substantially the same in the area to be evaluated, wherein "substantially the same" is defined in that the respective values of color, saturation and brightness of adjacent surfaces are distinguished by a maximum of a first threshold in percent;

d) recording a second image in the HSV color space if the color values H and the saturation values S of adjacent surfaces in the area to be evaluated in the first color image are substantially the same, whereas the brightness values V of the adjacent surfaces deviate strongly from each other, wherein "strongly deviating from each other" is defined in that the brightness values V of adjacent surfaces differ from each other by more than a second threshold in percent, wherein the exposure time of the second color image is selected such that the brightness values V of the adjacent surfaces are substantially the same within the area of the vehicle environment to be evaluated; and e) determining the drawbar from the second color image using an edge detection method to determine the articulation angle.

2. The method of claim 1, wherein the area to be evaluated comprises the drivable surface in the area of the drawbar.

3. The method of claim 2, wherein the first threshold is 1%.

4. The method of claim 2, wherein the second threshold is 10%.

5. The method of claim 2, wherein an HDR-capable backup camera is used.

6. The method of claim 1, wherein the first threshold is 1%.

7. The method of claim 6, wherein the second threshold is 10%.

8. The method of claim 6, wherein an HDR-capable backup camera is used.

9. The method of claim 1, wherein the second threshold is 10%.

10. The method of claim 9, wherein an HDR-capable backup camera is used.

11. The method of claim 1, wherein an HDR-capable backup camera is used.

12. A device for determining the articulation angle of a combination consisting of a towing vehicle and a trailer attached by a drawbar, wherein the device is configured and designed to perform the method of claim 1, having:

a backup camera with variable exposure times for generating color images for observing the rear environment of the towing vehicle;

an apparatus for transforming the recorded color images into the HSV color space;

an apparatus for comparing the color values H, brightness values V and saturation values S of adjacent surfaces in an area to be evaluated of the HSV-transformed color images;

an apparatus for calculating an exposure time as a function of the comparisons of the color values H, saturation values S and brightness values V of adjacent surfaces of the area to be evaluated; and an apparatus for determining the articulation angle by an edge detection method from the color images.

13. The device of claim 12, wherein an HDR-capable backup camera is used.

14. Use of the device of claim 12 in a trailer maneuvering assist.

15. A trailer maneuvering assist with a device of claim 12.

* * * * *